US009864994B2

(12) United States Patent
Huang et al.

(10) Patent No.: US 9,864,994 B2
(45) Date of Patent: Jan. 9, 2018

(54) TERMINAL FOR MAGNETIC SECURE TRANSMISSION

(71) Applicant: Samsung Pay, Inc., Burlington, MA (US)

(72) Inventors: Enyang Huang, Andover, MA (US); William Wang Graylin, Winchester, MA (US); George Wallner, Miami Beach, FL (US)

(73) Assignee: Samsung Pay, Inc., Burlington, MA (US)

( * ) Notice: Subject to any disclaimer, the term of this patent is extended or adjusted under 35 U.S.C. 154(b) by 0 days.

(21) Appl. No.: 14/980,718

(22) Filed: Dec. 28, 2015

(65) Prior Publication Data

US 2016/0125417 A1    May 5, 2016

Related U.S. Application Data

(63) Continuation of application No. 14/511,994, filed on Oct. 10, 2014.

(Continued)

(51) Int. Cl.
*G06K 5/00* (2006.01)
*G06Q 20/40* (2012.01)
(Continued)

(52) U.S. Cl.
CPC ....... *G06Q 20/40975* (2013.01); *G06Q 20/20* (2013.01); *G06Q 20/327* (2013.01);
(Continued)

(58) Field of Classification Search
CPC .......... G06Q 30/0236; G06Q 30/0242; G06Q 30/0254; G06Q 30/0258; G06Q 20/4018;
(Continued)

(56) References Cited

U.S. PATENT DOCUMENTS 6,206,293 B1    3/2001   Gutman et al.
7,114,652 B2   10/2006   Moullette et al.
(Continued)

FOREIGN PATENT DOCUMENTS

KR   10-2013-0082656 A       7/2013
WO   WO 2013151797 A1  * 10/2013  ............ H04W 12/04
WO        2014133863 A1       9/2014

OTHER PUBLICATIONS

European Search Report for Application 16174401.6. dated Dec. 2, 2016.

(Continued)

*Primary Examiner* — Laura Gudorf
(74) *Attorney, Agent, or Firm* — Seyfarth Shaw LLP; Brian Michaelis

(57) ABSTRACT

Devices, systems, and methods for securely converting a user's existing static payment card data into dynamic card data that can be authenticated by card issuers or by a stand-in service provider, such as a payment network or processor without requiring the card issuers to make infrastructure changes. The dynamic data can be provisioned onto a magnetic secure transmission device (MST) either directly from a card issuer or using a swiper type device. Devices, systems, and methods are also disclosed for securely provisioning a dynamic card onto the MST by the card issuer. These dynamic cards may be used to transmit modified one-time-use card track data from the MST to a point of sale using a dynamic-CVV methodology to provide higher levels of security during a transaction.

20 Claims, 12 Drawing Sheets

Related U.S. Application Data

(60) Provisional application No. 61/974,696, filed on Apr. 3, 2014, provisional application No. 61/942,681, filed on Feb. 21, 2014.

(51) Int. Cl.
  *G06Q 20/36* (2012.01)
  *G06Q 20/34* (2012.01)
  *G06Q 20/20* (2012.01)
  *G06Q 20/32* (2012.01)
  *G06Q 20/38* (2012.01)

(52) U.S. Cl.
  CPC ............. *G06Q 20/34* (2013.01); *G06Q 20/36* (2013.01); *G06Q 20/363* (2013.01); *G06Q 20/385* (2013.01); *G06Q 20/3823* (2013.01); *G06Q 20/40* (2013.01); *G06Q 20/409* (2013.01); *G06Q 20/4018* (2013.01)

(58) Field of Classification Search
  CPC .......... G06Q 20/409; G06Q 20/40975; G06Q 20/34; G06Q 20/36; G06Q 20/363; G06Q 20/20; G06Q 20/40
  See application file for complete search history.

(56) References Cited

U.S. PATENT DOCUMENTS

| | | |
|---|---|---|
| 7,347,361 B2 | 3/2008 | Lovett |
| 8,511,548 B1 | 8/2013 | Mori et al. |
| 8,628,012 B1 | 1/2014 | Wallner |
| 2004/0133787 A1 | 7/2004 | Doughty et al. |
| 2009/0159663 A1 | 6/2009 | Mullen et al. |
| 2009/0307132 A1* | 12/2009 | Phillips ............... G06Q 20/105 705/41 |
| 2011/0140841 A1* | 6/2011 | Bona ................ G06K 19/06187 340/5.83 |
| 2011/0320314 A1 | 12/2011 | Brown |
| 2012/0280035 A1 | 11/2012 | Liu et al. |
| 2013/0024372 A1 | 1/2013 | Spodak et al. |
| 2013/0256397 A1 | 10/2013 | Brown et al. |
| 2014/0310182 A1* | 10/2014 | Cummins .......... G06Q 20/4012 705/71 |

OTHER PUBLICATIONS

Korean Intellectual Property Office Notice of Preliminary Rejection for Application No. 10-2017-70009092. dated May 22, 2017.

* cited by examiner

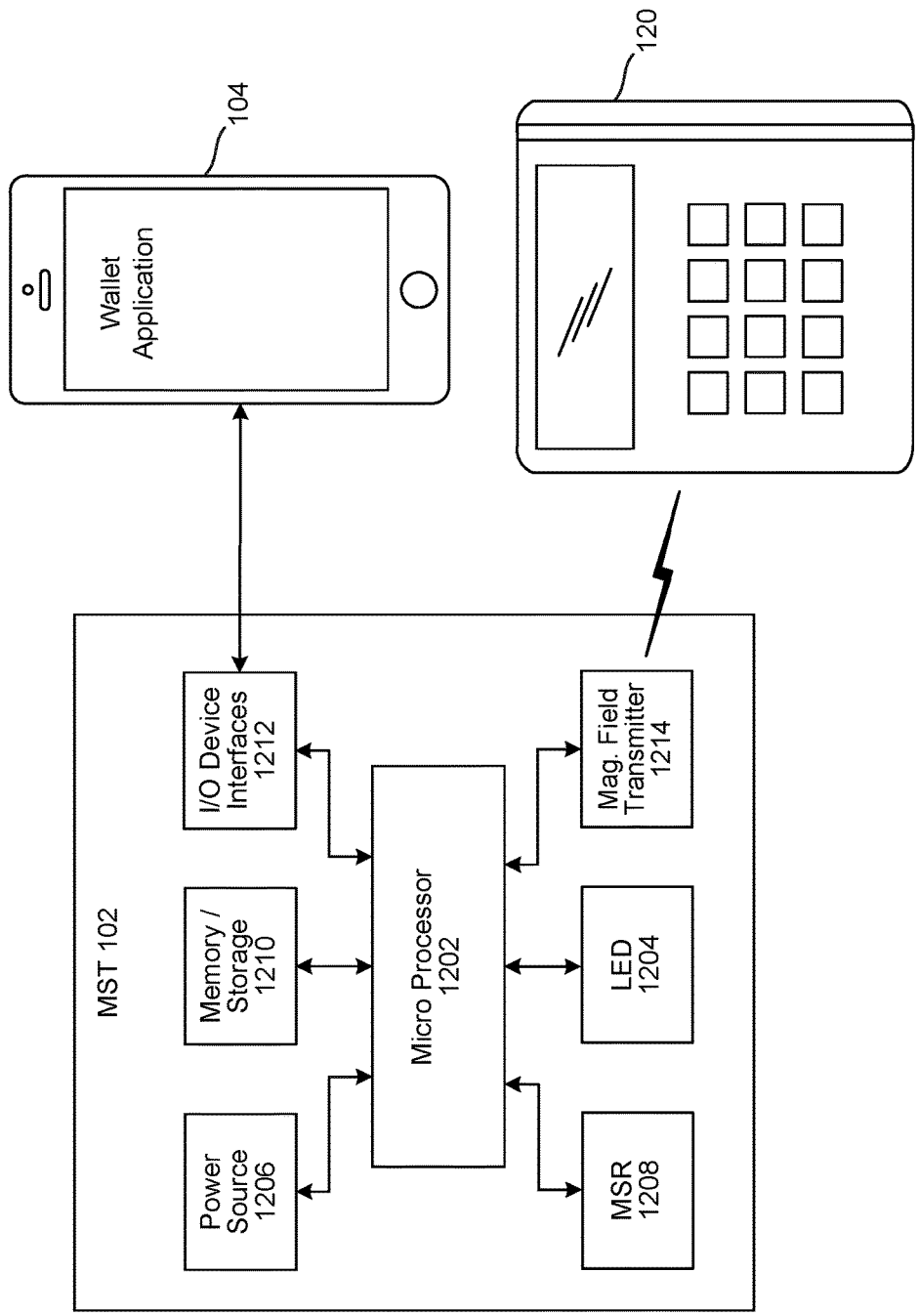

TERMINAL FOR MAGNETIC SECURE TRANSMISSION

CROSS REFERENCES TO RELATED APPLICATIONS

This application is a continuation of U.S. patent application Ser. No. 14/511,994 filed on Oct. 10, 2014 which claims the benefit of U.S. Provisional Patent Application Ser. No. 61/974,696, filed Apr. 3, 2014, and U.S. Provisional Patent Application Ser. No. 61/942,681, filed on Feb. 21, 2014, all of which are incorporated herein by reference in their entirety.

FIELD

The present disclosure relates to magnetic stripe data storage and secure transmission thereof.

BACKGROUND

Transmission of magnetic stripe data has been done primarily by swiping a magnetic stripe card against a magnetic stripe reader (MSR) to enable payment, identification (ID), and access control functions. Mobile wallet applications on smartphones and tablets have had difficulty interacting with existing merchant point of sale (POS) devices or other devices with MSRs. Contactless reader enabled POS terminals (typically using, for example, an ISO-14443 standard) are not ubiquitous to accept contactless or near field communications (NFC) payments. It would be expensive and would take time to replace the millions of merchant POS devices (or door locks) that only accept magnetic stripe cards, just to interact with NFC phones or other transmission means like barcodes.

Additionally, financial payment cards contain a card number, called the Primary Account Number or PAN, whose purpose is to identify the account the payment is made against. Cards also carry an Expiry Date, which indicates when the card expires. Most cards also carry in the magnetic stripe data a cryptographically generated Card Validation Value (also known as a CVV1), which prevents a valid card to be created from its PAN and Expiry Date information. Typically, cards are replaced after about 2 to 3 years, as the magnetic stripe gets worn out and issuers do not want a card to be active indefinitely.

Today the PAN is used not only to identify the account, but also to authorize charges in Card-Not-Present (CNP) transactions (as opposed to Card-Present (CP) transactions in which the card is physically swiped at a POS terminal), the vast majority of these being Internet transactions, but also include telephone orders and mail orders. The simple knowledge of the PAN, an Expiry Date, and the name on the card is sufficient to charge CNP purchases against the account. A CVV-2, as known in the art, is a 3- or 4-digit value printed on the card or signature strip, but not encoded on the magnetic stripe, to verify that the customer has the card in his/her possession. While a large percentage of e-commerce sites also require a CVV-2 for transactions, many do not.

The PAN and Expiry Date are hard to keep secret: they are printed on the front of the card and are contained in the magnetic stripe data or chip data of the card. During the POS transaction the magnetic stripe or the chip is read by the terminal and its data (including the PAN, expiry date, and CVV2) is transmitted through the retailer's system to the acquirer and then to the card issuer. The PAN, and to a lesser extent the Expiry Date, are used for a number of functions by retailer systems and cannot be obscured.

The magnetic stripe or chip card data is the target of data theft, either in transit or when in memory. Being static, the magnetic stripe data is subject to interception and copying, and a number of attacks. Stolen data, from which the PAN and Expiry Date can be easily extracted, can be used in fraudulent CNP transactions. A physical card can be skimmed by reading the magnetic stripe data on the card, or putting a reading device proximate to retailer POS terminals to capture magnetic stripe track data including the PAN and Expiry Date and the name on the card. A sniffing device can also be used to pick up track data from contactless cards in purses and wallets of unsuspecting shoppers at a retail establishment. Malware in a retailers POS system can also be used to capture the card data in route to the payment processor. Such stolen data may contain the PAN and the Expiry Date, both in magnetic stripe and smart card (for example, an Europay, MasterCard and Visa (EMV) card) transactions and can be used for CNP fraud. Additionally, captured magnetic stripe data also includes the CVV1, while captured on-line card data can include the CVV2. The key weakness of both CVV1 and CVV2 is that they are static: once learned they can be used in fraudulent transactions.

SUMMARY

The present disclosure relates to devices, systems, and methods involving a magnetic stripe storage and transmission device (also referred to as a MST (magnetic secure transmission) device) for use in conjunction with a mobile wallet application and platform to capture, store and transmit magnetic stripe card data to merchants' conventional point of sale (POS) terminals and other devices with magnetic stripe readers (MSRs) or online checkout systems, in physical and virtual environments.

The present disclosure also relates to devices, systems, and methods for converting static card data (for example, the CVV1 or CVV2) into dynamic cryptograms that can only be used one time, and cannot be replayed by fraudsters, and leveraging mobile devices to deliver payment information that includes the cryptograms back to the card issuer for authentication, without changing the existing merchant acceptance infrastructure whether it is for physical payment via POS or remote payment via online checkout. The devices, systems, and methods allow users to automatically convert the static card data into dynamic one time use card data that can be authenticated by the payment network or processor on behalf of the thousands of card issuers as a service, without infrastructure change and integration by each issuer.

In an aspect, a dynamic cryptogram which can be called a dynamic-CVV (dCVV) is used to secure card payments. A dCVV is generated freshly with a key plus primary account number (PAN), expiration or expiry date (EXP), timestamp and counter, when the card is used for payment in both Card-Not-Present (CNP) and Card-Present (CP) transactions. The dCVV, which is cryptographically generated, cannot be generated without the knowledge of the card data and a secret key. Also, each dCVV is only valid for a short period of time. This prevents the replaying attack described above, since re-use of the dCVV from a previously monitored transaction will result in an authorization error. The resulting cryptogram generated at the time of transmission from the secret key can be based on a number of methods depending on which token service provider (for example, the card issuer, the card issuer's processor, or the card issuer's payment network) created the secret key. The MST enabled user device is able to transmit different track data payloads with different cryptograms dictated by the token service provider, each in the proper magnetic card format recognizable by the point of sale terminals.

In another aspect, the card issuer or a stand-in service provider may differentiate CP transactions that use dCVV technology, because the validation algorithm used is different for dCVV transaction as opposed to ordinary magnetic stripe CP transactions. The dCVV transactions may be identified by replacing the EXP of the card data with a number equivalent to a date far into the future recognizable by the issuer or service provider. This obscures the EXP in a payment transaction while providing the card issuer with a convenient flag to recognize the card as being in dynamic or dCVV mode. Other flags can be used to indicate the card is in dynamic mode, such as a flag in a discretionary field of the track data used to indicate dynamic mode. The PAN can also be registered in the issuer or service provider's database as a dCVV card.

The concept of dCVV in the domain of MST also naturally applies to CNP transactions. In CNP transactions, a dynamically generated 3 digit code (or 4 digit code in the case of American Express cards) retrieved from the mobile wallet application, is dynamically computed at the time of request, is entered into the checkout web site or application. The masked EXP also retrieved from the mobile wallet application, to be entered also uses a date far in the future indicating that this is a dCVV CNP transaction. This way both the original CVV-2 and EXP are hidden from an attacker monitoring the transaction. Moreover, intercepting a particular CNP transaction does not lead to an attacker using the information in another transaction, because the CVV code is computed in real-time and changes between CNP transactions, and is time stamped so that it would expire after a short time.

In order to convert existing static card data into dynamic card data (also referred to as tokenized card data) for mobile users without requiring each card issuer to change their provisioning infrastructure, the devices, systems, and methods effectively allow cardholders to convert existing magnetic stripe card data into dynamic tokenized card data using mobile devices without requiring the card issuers to setup a separate remote mobile provisioning system. The card issuer, the issuer's processor, or the issuer's payment network may host the provisioning and authentication server to authenticate the dCVV packaged in the MST transmission, or dCVV2 for online transactions, and either validate for the issuer the dynamic card data is authentic, or validate and return the original track data (in the case of the payment network) or original CVV2 back to the issuer or its processor so that the payment network can perform the authentication service (or tokenization service) on behalf of the card issuer. This can dramatically speed up the conversion from static card data in the field to dynamic tokenized card data to enhance security for CP and CNP transactions.

BRIEF DESCRIPTION OF THE DRAWINGS

Embodiments of devices, systems, and methods are illustrated in the figures of the accompanying drawings which are meant to be exemplary and not limiting, in which like references are intended to refer to like or corresponding parts, and in which:

FIG. 12 is a functional block diagram of the MST according to aspects of the disclosure.

DETAILED DESCRIPTION

Detailed embodiments of devices, systems, and methods are disclosed herein, however, it is to be understood that the disclosed embodiments are merely exemplary of the devices, systems, and methods, which may be embodied in various forms. Therefore, specific functional details disclosed herein are not to be interpreted as limiting, but merely as a basis for the claims and as a representative basis for teaching one skilled in the art to variously employ the present disclosure.

In general, the present disclosure relates to leveraging magnetic stripe data storage and secure transmission devices to deliver secure cryptographic one time use payment data on existing payment acceptance infrastructures.

Figure 1:
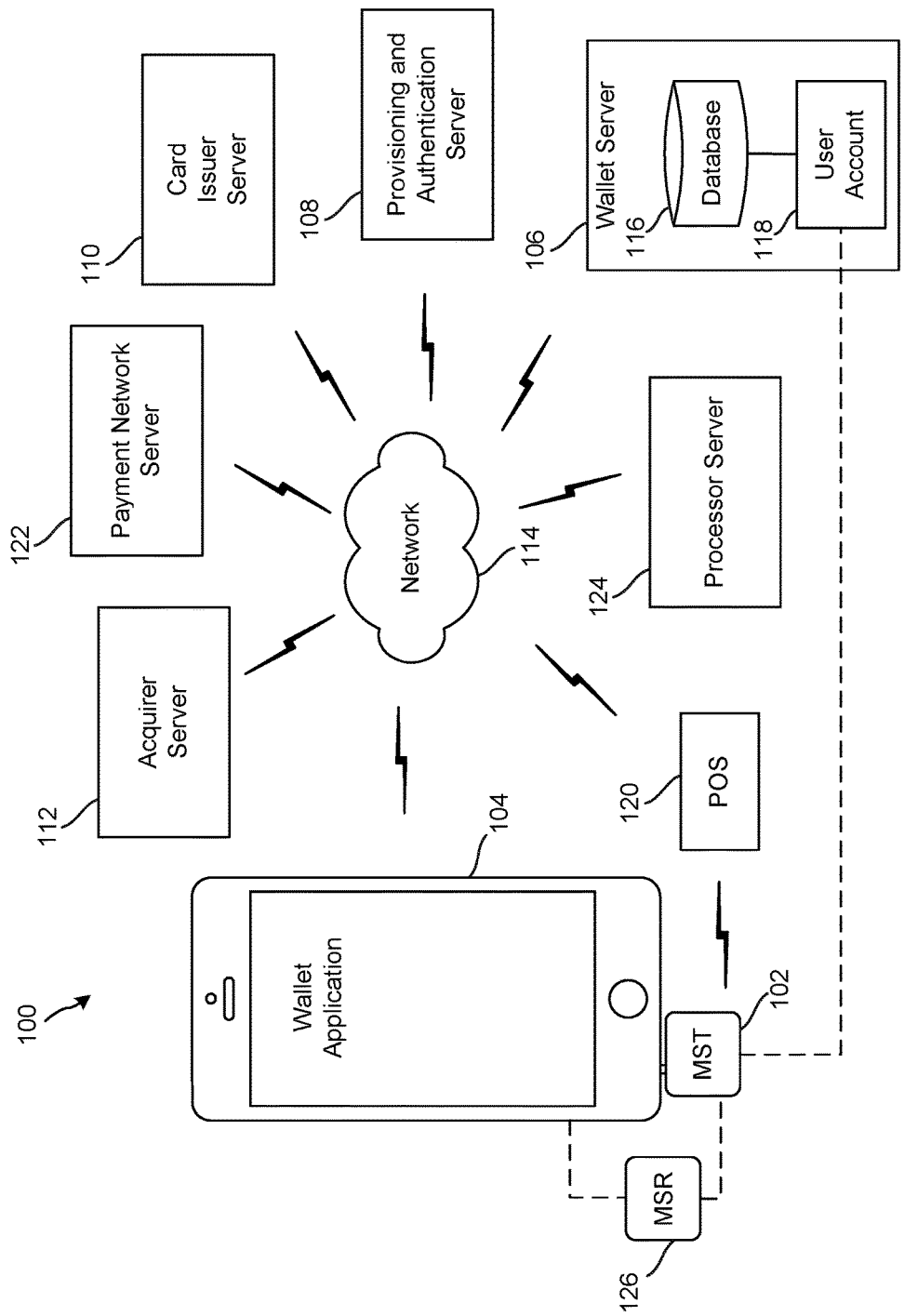
FIG. 1 is a functional diagram of an overview of a system according to aspects of the disclosure.

An overview of a system 100 involved in secure card provisioning and transmission according to an illustrative embodiment is described with reference to FIG. 1. The overall system 100 includes a MST 102, a mobile communication device 104, a wallet server 106, a provisioning and authentication server 108 (also referred to as a token service provider), a card issuer server 110, an acquirer server 112, a point of sale (POS) 120, a payment network server 122, a processor server 124 (e.g., a third party processor server of the issuer), and an encrypted magnetic stripe reader 126 (MSR) which can be part of the MST 102 (as illustrated in FIG. 12) or work alone with a wallet application on the mobile communication device 104. The MST 102 interfaces with the mobile communication device 104 or may be embedded in the mobile communication device 104, and the mobile communication device 104 communicates with the wallet server 106, provisioning and authentication server 108, card issuer server 110, and acquirer server 112 via a network 114. Each of the wallet server 106, provisioning and authentication server 108, card issuer server 110, acquirer server 112, payment network server 122, and processor server 124, may also communicate with one another via the network 114. In some embodiments, the provisioning and authentication server 108 may be hosted by the card issuer or card issuer server 110, the card issuer's processor or processor server 124, or the card issuer's payment network or payment network server 122.

In an aspect, the wallet server 106 may include one or more databases 116 and user accounts 118. The one or more databases 116 may store association data of the MST 102 and the user accounts 118, and one or more keys used by the MST 102 and/or the wallet server 106. The MST 102 may be registered with a user account 118, as described in further detail below.

It should also be appreciated that the provisioning and authentication server 108, the card issuer server 110, and the acquirer server 112 may also include one or more databases and other components, such as, software and/or hardware to allow for the methods disclosed herein to be performed.

As illustrated, the MST 102 may be a dongle that may be connected to and disconnected from the mobile communication device 104. The MST 102 and the mobile communication device 104 are user devices operated by the user. The MST 102 may communicate with the mobile communication device 104 through an audio port and/or through other types of communication interfaces, for example including, but not limited to, a USB port, a 30pin or 9pin Apple interface, a Bluetooth interface, a near field communication (NFC), and other serial interfaces. While the MST 102 is illustrated as a dongle, the MST may be another type of peripheral device that communicates with the mobile communication device 104 through a contactless interface, such as Bluetooth or NFC; or the MST 102 may be embedded inside of the mobile communication device 104 as part of mobile communication device 104. The MST 102 is capable of transmitting magnetic signals to a POS at a distance of approximately 1 to 3 inches from a magnetic stripe reader of the POS.

In an aspect, a user may set up the user account 118 on the wallet server 106, for example, by downloading and/or installing a wallet application on the mobile communication device 104. The wallet application 104 may be an interface for a user to view a list of cards available for Card-Not-Present (CNP) and Card-Present (CP) transactions. In an aspect, the user may choose or select a card and transmit card data corresponding to the card (for example, card track data) using the MST 102, in either a static or a dynamic mode (such as a dynamic-CVV (dCVV) mode). Similarly, when performing CNP transactions, the user may view a dynamically computed Expiry Date (EXP) and CVV-2 and use them to fill checkout web forms to perform a dCVV CNP transaction.

The user may also set up the user account 118 using a computer connected to the network 114 by accessing a user account web portal. To set up the user account 118, the user may specify a username, password and a personal PIN. The password may be used to login to the wallet application on the mobile communication device 104. Once the user is logged in, the personal PIN may be used to enter a payment card section of the wallet application, as well as to unlock the wallet application.

The user may optionally add the MST 102 to the user account 118 by specifying a globally unique identifier (GUID) of the MST 102 (also referred to herein as $ID_{MST}$). The PIN (which only the user knows) is used to authenticate with the MST 102 to operate any card data stored on the MST 102. A copy of the PIN may also be stored on the wallet server 106 and used as described below. Operation of the MST 102 using the PIN-based authentication can be done with or without the mobile communication device 104 being connected to the wallet server 106 via the network 114. This allows the MST 102 to be operated to utilize the card data stored on the MST 102, even when no network connection exists.

The MST 102 can store magnetic stripe card data by either an initial load at manufacturing, loading via a wireless communication network after setting up the user account 118, and/or by the consumer loading his/her own card(s) data directly into the MST 102 using an encrypted MSR prompted by the mobile wallet application. The MST 102 may transmit the magnetic stripe card data in both static (in which it transmits the original data without modification) and in dynamic or dCVV mode (in which part of the data is dynamically computed each time during transmission). In general, the user is a person that has set up a user account, for example, on the wallet server 106 via a cloud computing infrastructure (such as via the network 114), and has initialized the wallet application on his/her mobile communication device 104.

Figure 2:
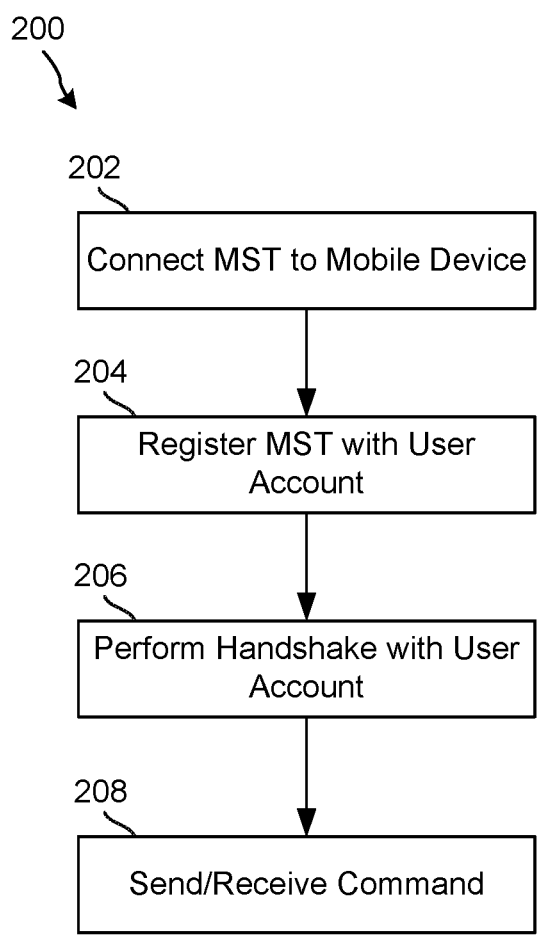
FIG. 2 is a flow diagram of a method of operation of initializing an MST according to aspects of the disclosure.

A method 200 of initializing the MST 102, having a unique device ID, to a user account 118 according to an illustrative embodiment is described with reference to FIG. 2. An MST is initialized or registered for the first time to a user account by plugging in or connecting the MST to the mobile communication device, illustrated as block 202. Upon connecting the MST to the mobile communication device, the wallet application recognizes the MST and registers the MST with the user account of the user, illustrated as block 204. When the MST has been registered and connected to the appropriate user account, the MST and the user account may perform a handshake, illustrated as 206, and send and receive commands, illustrated as block 208.

Once the MST has been registered with the user account, the user can use the wallet application to load his/her cards by swiping the cards on a built in MSR of the MST or a separate MSR that may be connected to the MST or the mobile communication device. The card data may be digitized and encrypted, and stored in the MST for later use. For example, as illustrated in FIG. 1, the cards may be used by the MST 102 and sent to a point of sale (POS) 120 to effect a transaction. In this aspect, the POS 120 may also communicate with one or more of the wallet server 106, provisioning and authentication server 108, card issuer server 110, and/or the acquirer server 112, via the network 114.

Figure 3:
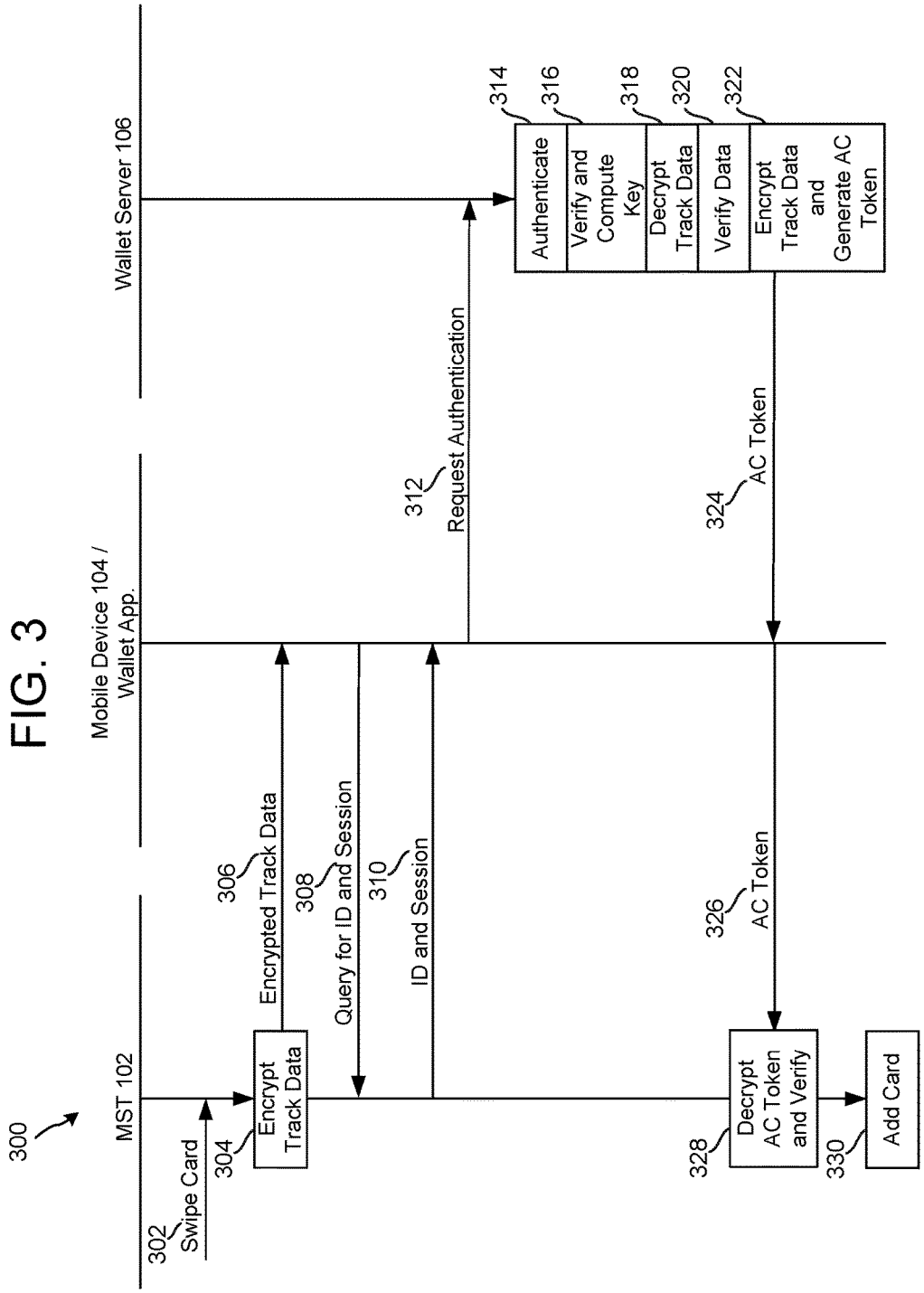
FIG. 3 is a flow diagram of a method of provisioning a static card based on a user swiping the card according to aspects of the disclosure.

A method 300 for securely provisioning a static card based on a user swiping the card according to an illustrative embodiment is described with reference to FIG. 3. As used herein, "static" means that the same card data is transmitted to the POS each time when used. In this embodiment, the user may use a swiper device integrated into or coupled to the MST to load cards into the user's MST.

A user swipes a card (for example, a payment card or other type of card including magnetic card data) in to a swiper in the MST or a separate swiper accessory device coupled to the MST (302). This provides card data including card track data (i.e. data corresponding to the card) ("TRACK") to the MST. The MST then encrypts the TRACK using a key ($K_{working}$) (304) and sends the encrypted TRACK and a key serial number (KSN) (for example, a 10-byte KSN) to the mobile communication device (306). In an aspect, the KSN contains a monotonically increasing counter; therefore swiping the same card twice should yield two distinct pieces of cipher-text. The MST may also send some auxiliary information (A*) that may be used by the wallet server when the wallet server later performs a signature verification, as described below. In one example, the MST sends the following to the mobile communication device: {TRACK}$K_{working}$, KSN, A*, where the brackets indicate an encryption function.

The mobile communication device queries the MST for its identifier ($ID_{MST}$) and session nonce $R_{MST}$ (308). In response to the query, the MST sends the $ID_{MST}$ and $R_{MST}$ to the mobile communication device (310). The mobile communication device forwards this information (for example, $ID_{MST}$, $R_{MST}$, {TRACK}$K_{working}$, KSN, A*) to the wallet server, plus the user's input credential(s) (for example, a username and password) for the wallet server to authenticate (312).

The wallet server authenticates the user using the username and password, and also checks to see if the $ID_{MST}$ is currently connected to the user's wallet account (314). The wallet server may also verify the validity and monotonicity of KSN and independently compute $K_{working}$ (316). If everything is verified, the wallet server decrypts the encrypted track data and obtains TRACK (318). The wallet server may also perform a check to ensure the data received is valid (320). For example, the wallet server may check that TRACK contains valid ISO-7812 strings. For financial cards, both track 1 data and track 2 data should be present. For non-financial cards, (for example, gift cards), at least one of the tracks should be present. The wallet server may also perform a longitudinal redundancy check (LRC) to check the correctness of the data. For financial cards, the card holder name from the track 1 data should be consistent with the user's wallet account username on file, and the expiration date of the card should be valid (i.e. card not expired).

If the wallet server is satisfied, the wallet server re-encrypts TRACK using a key known to the MST ($K_{MST}$) (322) and sends back an AddCard (AC) token to the mobile communication device (324) over an SSL/TLS session. The AC token may include the $R_{MST}$, a server generated timestamp ($R_S$), TRACK, and A* encrypted using $K_{MST}$ (for example, {$R_{MST}$, $R_S$, TRACK, A*}$K_{MST}$).

The mobile communication device forwards the AC token to the MST (326) without interpretation. The MST decrypts the AC token using $K_{MST}$ and verifies $R_{MST}$ for relevancy (328). If everything verifies, the MST deposits the TRACK and the add card operation is complete (330). The use of point-to-point encryption and random nonce properly defends requirements on confidentiality, authenticity and freshness.

Figure 4:
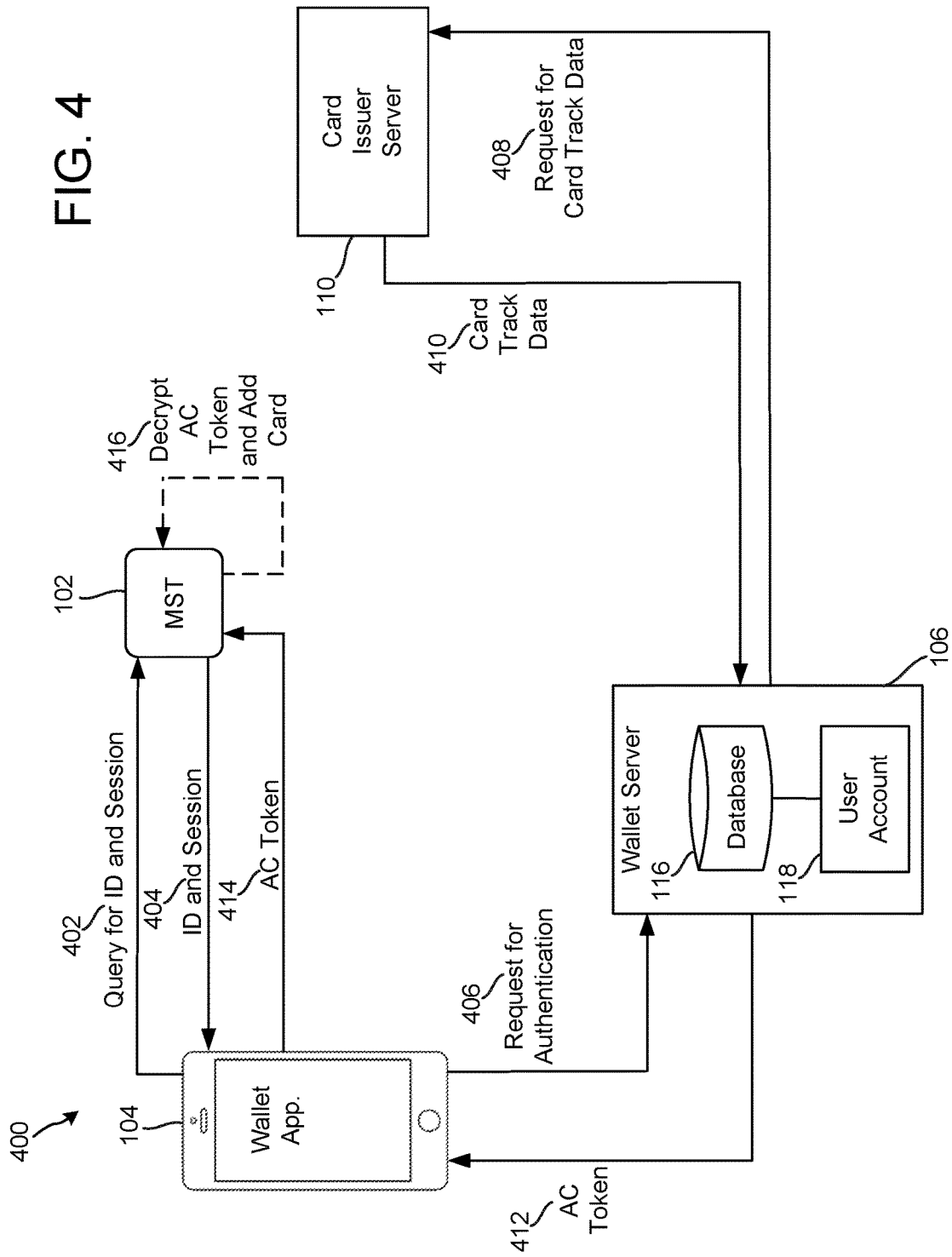
FIG. 4 is a flow diagram of a method of provisioning a static card from a card issuer according to aspects of the disclosure.

A method 400 for securely provisioning a static card from a card issuer according to an illustrative embodiment is described with reference to FIG. 4. In this embodiment, a card issuer may push card data over-the-air or via the network into the MST. This method is similar to the static provisioning method described above, except that the card data (including the TRACK) originates from a card issuer server and is sent from the card issuer server to the wallet server, and then pushed securely into the MST. The user initiates the process by nominating which issuer server to send a card request to. After the initial setup, the issuer server can notify the user when new cards are available to download. The user can then authenticate with the issuer server and download the actual card data.

Upon a user request, the mobile communication device queries the MST for the $ID_{MST}$ and session nonce $R_{MST}$ (402), and the MST sends the $ID_{MST}$ and $R_{MST}$ to the mobile communication device (404). With input from the user, the mobile communication device forwards this information to the wallet server, plus the user's credential (for example, $ID_{MST}$, $R_{MST}$, username, password) (406). The user may also input information (B*) for authenticating the user with the card issuer server (for example, the card issuer's identity and the user's online banking credential(s)). The wallet server sends B* to the card issuer server (408) to obtain the card data (including the TRACK). The wallet server then receives the TRACK from the card issuer server (410). The wallet server may interact with the card issuer server directly or through the provisioning and authentication server.

The wallet server encrypts the TRACK using $K_{MST}$, generates an AC token (for example, {$R_{MST}$, $R_S$, TRACK, A*}$K_{MST}$), as described above, and sends the AC token to the mobile communication device (412). The mobile communication device forwards the AC token to the MST (414). As described above, the MST decrypts the AC token using $K_{MST}$ and verifies $R_{MST}$ for relevancy, and if everything verifies, the MST deposits the TRACK and the add card operation is complete (416).

In another aspect, a dynamic card/tokenized card (for example, that supports dCVV) may be provisioned into the MST and then transmitted to a POS. In this aspect, a dCVV key ($K_{dCVV}$) may be generated and sent to the MST by a card issuer server or sent to the card issuer server from the MST to facilitate dynamic provisioning. A method 500 for dynamically provisioning a card according to an illustrative embodiment is described with reference to FIG. 5. Similar to the methods described above, the user may swipe a card to input the card data (including the TRACK) or the TRACK may be pushed to the MST by a card issuer server.

In an aspect, the user swipes a card (for example, a payment card or other type of card including magnetic card data) in to a swiper in the MST or a separate swiper accessory device coupled to the MST (502). This provides card data (including the TRACK) to the MST. The MST or separate MSR encrypts the TRACK data using a key ($K_{working}$) and sends the encrypted TRACK to the mobile communication device (504), which sends the encrypted TRACK to the wallet server (506). The MST may also send additional information with the TRACK, for example, the MST may send the $ID_{MST}$, $R_{MST}$, username, password, KSN, and A* (i.e. auxiliary information that the wallet server uses to perform signature verification as well as for the card issuer server to perform authentication of the user/card holder) along with the encrypted TRACK.

In a similar manner as described above, the wallet server authenticates the user using the username and password, and also checks to see if the $ID_{MST}$ is currently associated with the user's wallet account. The wallet server may verify the validity and monotonicity of KSN. The wallet server may also perform a check to ensure the data received is valid. For example, the wallet server may check that TRACK contains valid ISO-7812 strings. For financial cards, both track 1 data and track 2 data should be present. For non-financial cards, (for example, gift cards), at least one of the tracks should be present. The wallet server may also perform a longitudinal redundancy check (LRC) to check the correctness of the transmitted data. For financial cards, the card holder name from the track 1 data should be consistent with the user's wallet account username on file, and the expiration date of the card should be valid (i.e. card not expired).

In some instances, the wallet server may determine whether the card is eligible for dCVV by checking to see if the card's Permanent Account Number (PAN) is from a participating issuer based on a BIN (Bank Identification Number, first 6 digits of the PAN). If not, the static provisioning described above may take place. Assuming the card is eligible for dCVV, the wallet server sends a request for provisioning to the provisioning and authentication server (508). The request may include the PAN and auxiliary information for the card issuer/card issuer server to authenticate the user, such as a CVV-2, name, date of birth, answer to a challenge question, and/or other information.

It should be appreciated that the steps described above are merely one way of identifying the user and the card subject to dCVV to the card issuer and provisioning and authentication server(s). Other ways can be implemented. For example, a user without a swiper device may connect with the card issuer server by providing online banking credentials, and request a download of a dCVV card from the card issuer server. The card issuer server may also inform the wallet server that it is ready.

The provisioning and authentication server may identify that the request, from step 508, is from the wallet server, and the wallet server is trustworthy. In one aspect, the provisioning and authentication server believes that the wallet server has authenticated the MST on its behalf. In another aspect, the provisioning and authentication server may perform additional verification with the card issuer server, using A* (510). The card issuer server may optionally return, beside the verification result, some auxiliary information B*, such as PAN alias, embossing art, etc. (512).

The provisioning and authentication server generates a random key ($K_{dCVV}$) for the card (514), and inserts in its database a 3-tuple of: {PAN, $K_{dCVV}$, $T_{stamp}$}, where $T_{stamp}$ is a time-stamp of the current time in universal time coordinated (UTC), or relative to a fixed time reference. The time-stamp may also contain a counter CC that increments at each MST transaction. The combination of time-stamp and counter is used to provide a freshness component for the dynamic transactions.

The provisioning and authentication server sends the $K_{dCVV}$ to the wallet server, optionally along with the auxiliary information B* (516). The wallet server sends $K_{dCVV}$ and SYNC (where SYNC contains the time-stamp information, and is used to synchronize time between the MST and the wallet server) to the mobile communication device (518), which then forwards $K_{dCVV}$ and SYNC to the MST (520). $K_{dCVV}$ and SYNC may be signed or encrypted to provide security. The wallet server may also send some additional information to the MST, via the mobile communication device, along with $K_{dCVV}$; for example, the wallet server may also send TRACK.

The SYNC may be a packet that is used by the MST to adjust its internal reference of time. This allows the MST to provide an accurate time-stamp. When used, the MST transmits the time-stamp plus a cryptogram which is generated using the $K_{dCVV}$, PAN, EXP, and the time-stamp. Since the time-stamp is synchronized, the server that performs authorization can check for packet freshness and verify the cryptogram. The use of time-stamp serves to prevent replay type attacks because the cryptogram generation is time-stamped, and any delay in consuming the cryptogram risks it being rejected by the authorization logic on the server. The resulting cryptogram generated at the time of transmission from the key can be based on a number of methods depending on which token service provider (for example, the card issuer, the card issuer's processor, or the card issuer's payment network) created the key. The MST enabled user device is able to transmit different track data payloads with different cryptograms dictated by the token service provider, each in the proper magnetic card format recognizable by the point of sale terminals.

In the case where the card data (including the TRACK) is pushed over-the-air to the MST instead of being swiped into the MST by the user, the provisioning and authentication server receives the TRACK from the card issuer server and sends the TRACK to the wallet server along with $K_{dCVV}$, and optionally B*. The rest of the process is similar to the process described above. For example, the wallet server encrypts TRACK and $K_{dCVV}$ using $K_{MST}$, generates an AC token (for example, {$R_{MST}$, $R_S$, TRACK, $K_{dCVV}$, B*}$K_{MST}$), and sends the AC token to the MST via the mobile communication device.

Figure 5:
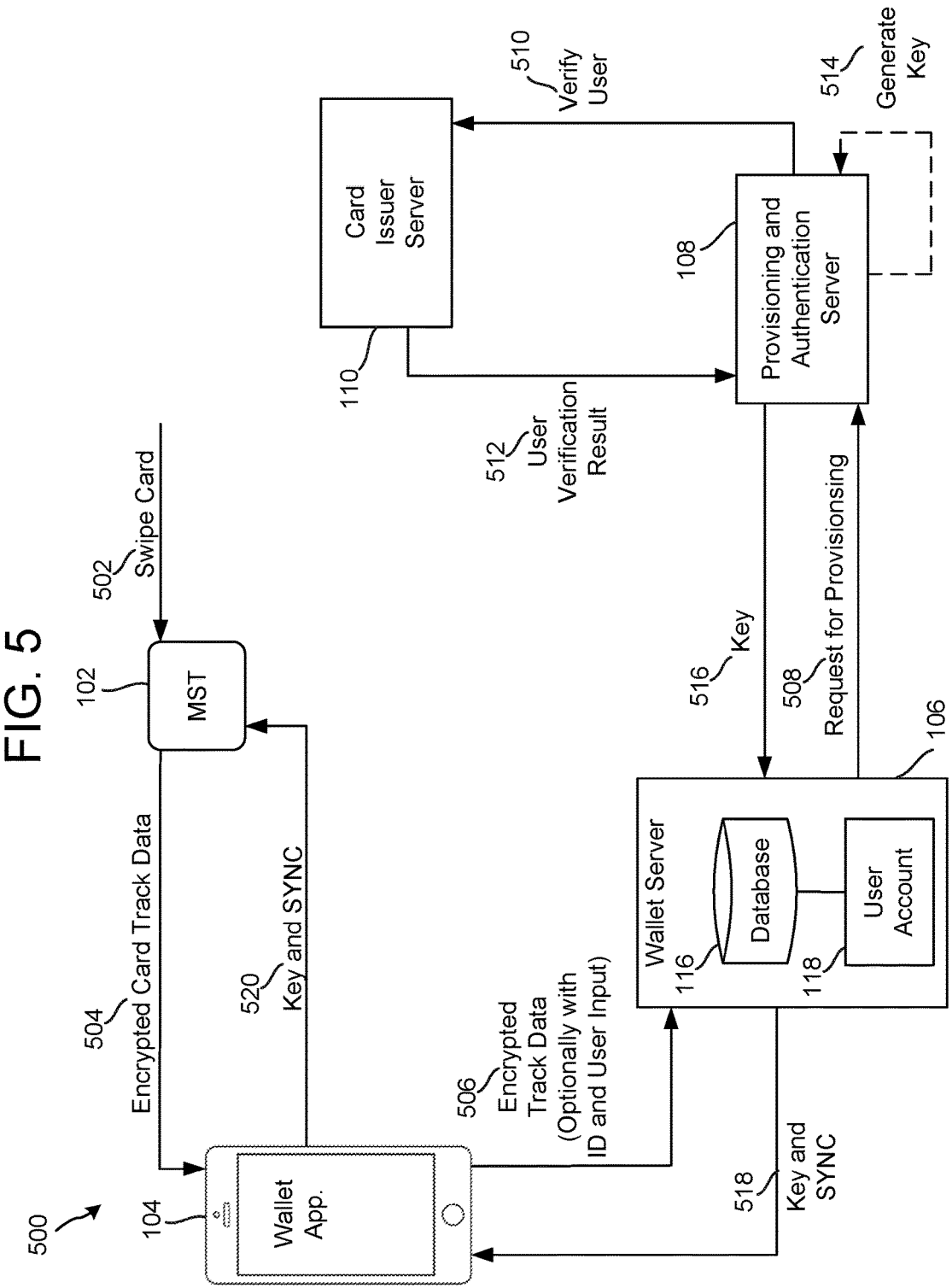
FIG. 5 is a flow diagram of a method of dynamically provisioning a card according to aspects of the disclosure.

Additionally, static card data, described above, may be converted to dynamic card data/tokenized card data (for example, using dCVV) in accordance with the step of FIG. 5. For example, instead of swiping the card into the MST at step 502, the static card may be pulled from memory or storage and converted into a dynamic card in the same manner as steps 504-520. It should also be appreciated that the steps of 510 and 512 may be optional, and the provisioning and authentication server may simply convert the static card into a dynamic card without authentication of the user with the card issuer server.

In another aspect, card data, for example, including the TRACK, may be provisioned securely from the card issuer server (or a processor on behalf of a card issuer) to a MST of an account holder, without revealing the content of data outside of the account holder, for example when a card issuer or its processor wants to provision to the wallet application or their own mobile banking application without going through the wallet server. A method 600 for provisioning a dynamic card according to an illustrative embodiment is described with reference to FIG. 6.

Figure 6:
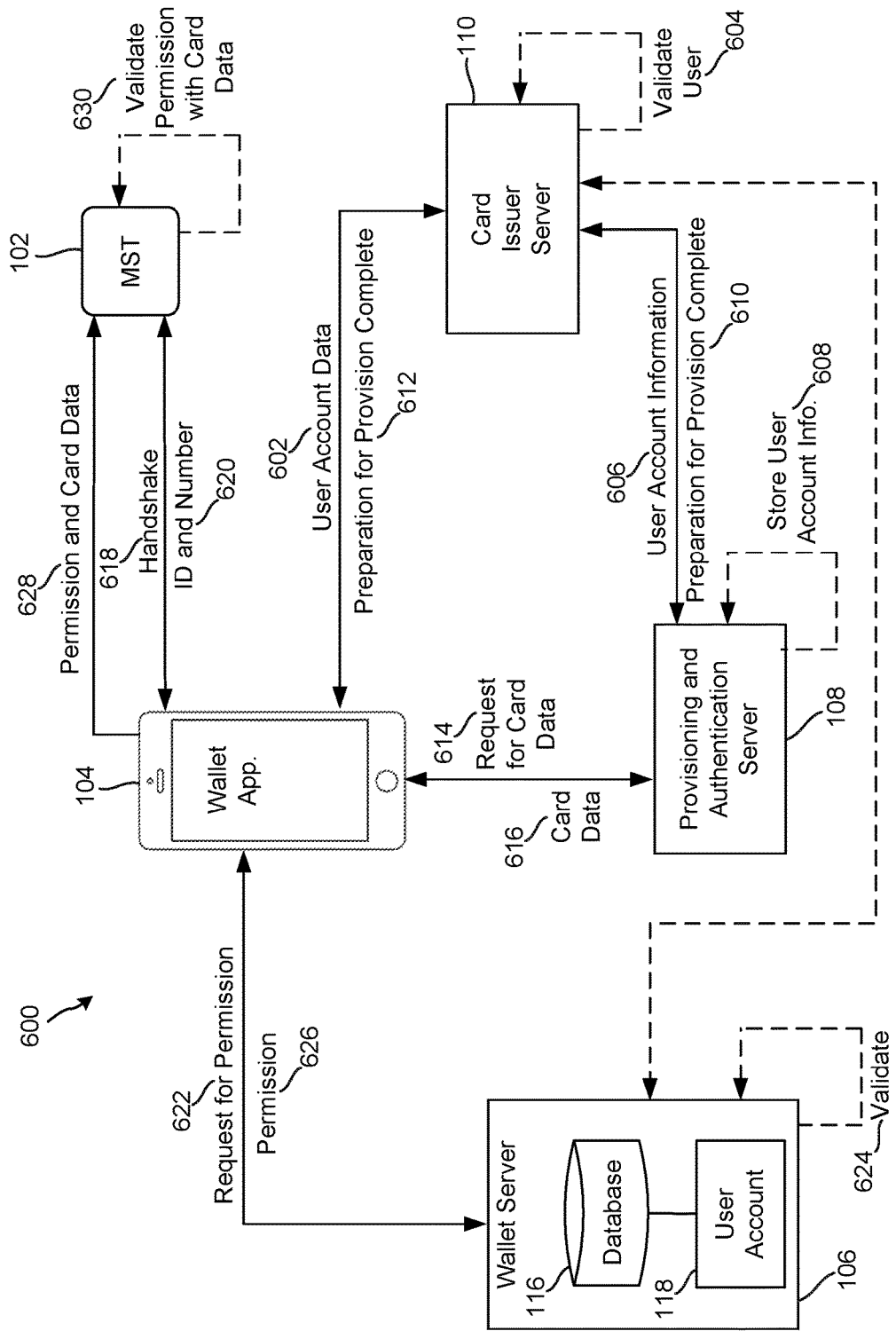
FIG. 6 is a flow diagram of a method of provisioning a card according to aspects of the disclosure.

As illustrated in FIG. 6, the user (i.e., a user having an account with the card issuer) authenticates with the card issuer server (602), for example, by receiving and sending user account data (e.g., the user's online banking login and password) from the mobile communication device to the card issuer server. The card issuer server validates the user using the user account data (604). The card issuer server then notifies the provisioning and authentication server of the user's account information (606), for example, including, but not limited to a PAN, card holder name, as well as an "authorization string" to authenticate and identify the user and account, and an identifier assigned to the card issuer ("$ID_I$"). The provisioning and authentication server stores the authorization string, $ID_I$, and user's account information (608). The user's account information may include a working key generated by the provisioning and authentication server, and/or an embossing file in the case of static card provisioning.

The provisioning and authentication server then informs the card issuer server that preparation for provisioning is compete (610). In response, the card issuer server informs the mobile communication device that preparation is complete, for example, by sending the authorization string and $ID_I$ to the mobile communication device (612). The mobile communication device uses the authorization string and $ID_I$ to request card data from the provisioning and authentication server by sending a request for data (614). The data will only be revealed to card issuer's account holder (i.e., the user having an account with the card issuer). In response to the request, the provisioning and authentication server returns the card data and optionally a digest of data referred to as "DD" (616). The DD may include a hash of the card data, a name of the account holder if this is a card embossing file, and a time-stamp of generation of this DD. In an aspect, a signature of the DD may also be returned with the data. The signature may be signed by the card issuer or a card processor's working private key, and must be openly verifiable using a corresponding public certificate.

The mobile communication device then performs a handshake with the MST (618) and the MST sends the $ID_{MST}$ and $R_{MST}$ to the mobile communication device (620). The mobile communication device sends this information along with additional information (for example, $ID_{MST}$, $R_{MST}$, DD, and the signature of DD) to the wallet server and requests permission (622). Note, the actual data is not sent to the wallet server in this case. The wallet server performs one or more validations (624), for example, to verify the signature to ensure the signature corresponds to DD and comes from a card issuer that the wallet server recognizes and is authorized, as well as other auxiliary checks, such as to ensure the name in DD matches the wallet account name; and that the time-stamp for DD generation is current. If everything validates or check out, the wallet server retrieves the $K_{MST}$ corresponding to $ID_{MST}$, and generates a permission cryptogram, including $\{DD, R_{MST}\}K_{MST}$. The wallet server returns this permission to the mobile communication device (626). The mobile communication device injects the card data, $ID_I$ and the permission into the MST (628). The MST decrypts the permission using $K_{MST}$ and obtains DD and $R_{MST}$, and validates the card data with DD (630). The MST knows $R_{MST}$ is fresh so there is no replay attack. Successful decryption also suggests that the permission came from the wallet server. The MST then independently computes a hash of the data and compares it to the corresponding portion of DD. If the two match, the MST proceeds and installs the data. As described above, the data may include, for example, the TRACK. Further, in this process, the wallet server does not have access to the card data throughout the provisioning process. The wallet server merely provides permission to the digest of the data.

While FIG. 6 is described with respect to performing card provisioning without going through the wallet server, the card issuer server may communicate with the wallet server to perform card provisioning and the provisioning and authentication sever may handle the authentication. It should also be appreciated that there are numerous ways in which the various servers may communicate with each other to perform card provisioning and authentication.

Figure 7:
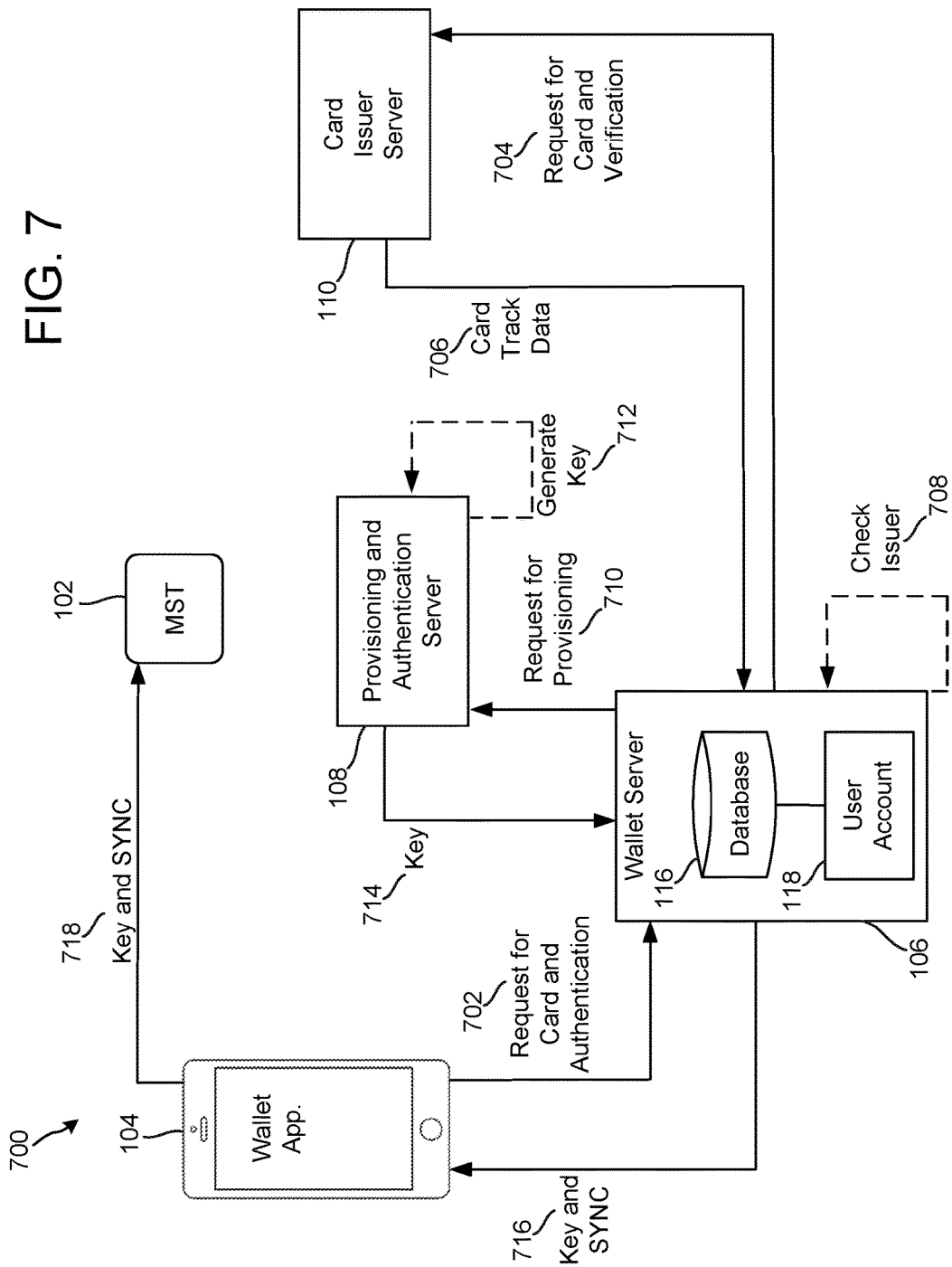
FIG. 7 is a flow diagram of a method of provisioning a dynamic card according to aspects of the disclosure.

In another embodiment, users may authenticate with a card issuer and initiate download of cards directly from card issuers. If the card is from a participating issuer that has the capabilities to authenticate dynamic cards, either by themselves or by their payment network, the wallet server may automatically initiate a conversion of the static track data into a dynamic card via the provisioning and authentication server. A method 700 for provisioning a dynamic card according to an illustrative embodiment is described with reference to FIG. 7. The user (i.e., a user having an account with the card issuer) authenticates with the card issuer server.

In this embodiment, the mobile communication device sends authentication information (for example, $ID_{MST}$, $R_{MST}$, username, password, and A* (where A* includes information, such as, an issuer account credential based on the issuer's authentication requirements)) to the wallet server (702). The wallet server forwards the authentication information (for example A*) to the card issuer server for verification (704). The card issuer server performs a validation and sends back to the wallet server the TRACK for the card and any other information required for presentation (for example, TRACK and C* (where C* may include a logo, image and/or other artwork) (706).

The wallet server checks and determines whether the card issuer is registered and/or participates in dynamic card authentication (708). If the card issuer does not, then the process proceeds in accordance with static card provisioning, as described above. If the card issuer does participate in dynamic card authentication, the wallet server sends a request for provisioning to the provisioning and authentication server (710). The request may include the PAN and auxiliary information, such as a CVV-2, name, date of birth, answer to a challenge question, and/or other information.

The provisioning and authentication server generates a random key ($K_{dCVV}$) for the card (712), and inserts in its database a 3-tuple of: $\{PAN, K_{dCVV}, T_{stamp}\}$ (as described above with reference to FIG. 5). The provisioning and authentication server sends the $K_{dCVV}$ to the wallet server, optionally along with the auxiliary information B* (714). The wallet server retrieves the MST's $K_{MST}$ from $ID_{MST}$, and sends $K_{dCVV}$ and SYNC (where SYNC contains the time-stamp information, and is used to synchronize time between the MST and the wallet server) to the mobile communication device (716), which forwards $K_{dCVV}$ and SYNC to the MST (718). $K_{dCVV}$ and SYNC may be encrypted or signed using $K_{MST}$ to provide security. The wallet server may also send some additional information to the MST, via the mobile communication device, along with $K_{dCVV}$; for example, the wallet server may also send TRACK, $R_{MST}$, $R_S$, B*, where B* is some auxiliary information from the card issuer.

Once the card(s) or TRACK(s) are loaded into the MST, the MST may be used to transmit the card data at a POS to effect a transaction. In one aspect, the data may be dynamically generated to provide security to the data being transmitted.

In this aspect, at each transmission, the MST constructs, for example, modified track 2 data (MT) containing a dCVV, which is derived from the card data, $T_{stamp}$ from the MST (the current time stamp from the MST) and $K_{dCVV}$. The dCVV may include a 3 digit code that is computed as a function of $K_{dCVV}$, including the PAN, expiration date of the card (EXP), service code (SVC), and $T_{stamp}$. For example, dCVV=$fK_{dCVV}$ (PAN, EXP, SVC, $T_{stamp}$). After dCVV is generated, the counter value stored in the MST within the current time unit interval (i.e. 10 min, 1 hour, etc.), is incremented by one.

Figure 8:
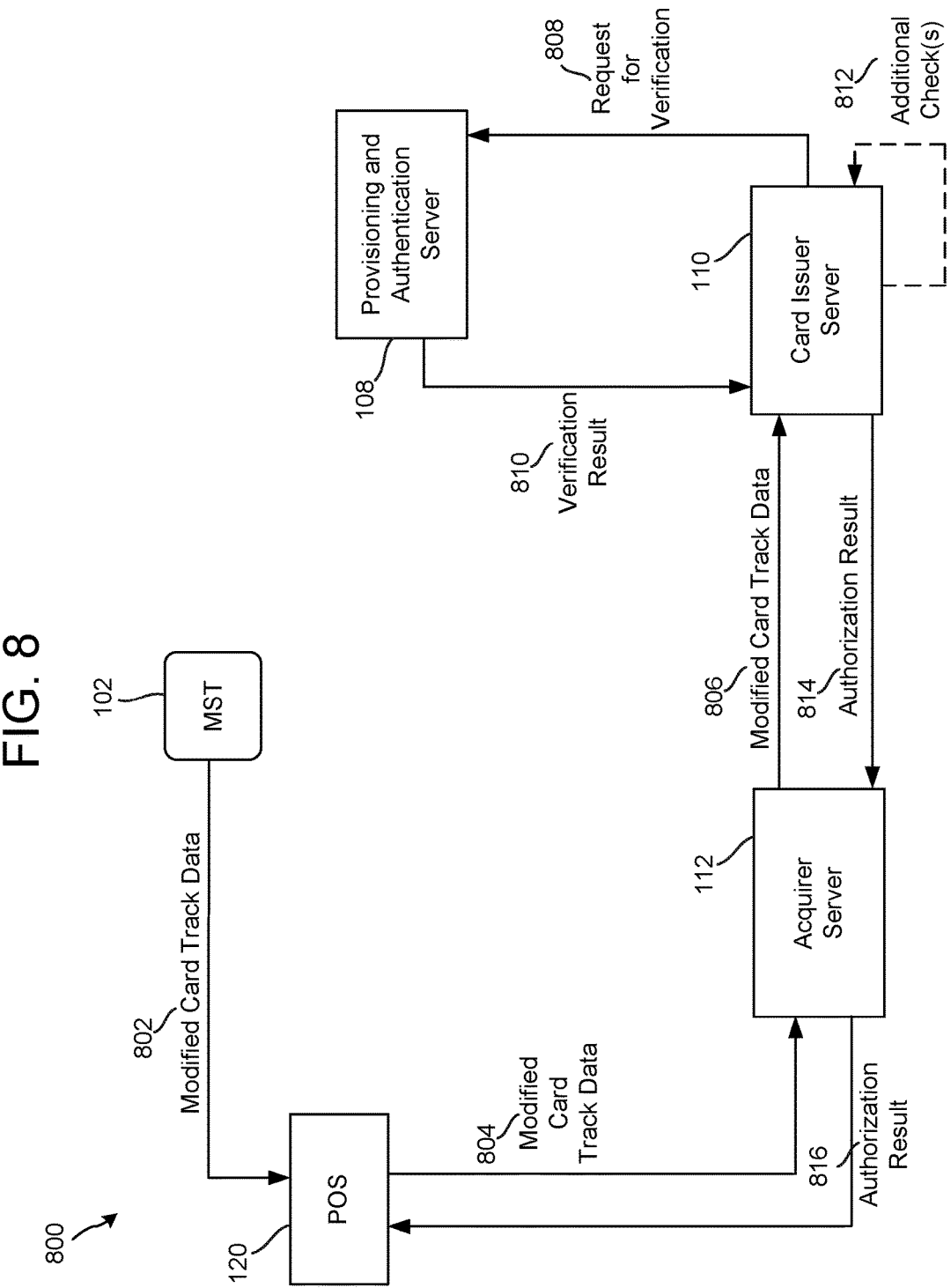
FIG. 8 is a flow diagram of a method of performing dynamic-CVV (dCVV) according to aspects of the disclosure.

A method 800 for performing dCVV according to an illustrative embodiment is described with reference to FIG. 8. The sequence of steps of transmission and verification by the card issuer server include the MST sending modified card data including a cryptogram (for example, using dCVV) to a POS terminal (802), which forwards the modified card data to an acquirer server (804), which then forwards the modified card data to the card issuer server (806). The payload of the transmission may include: a start sentinel (SS), PAN, field separator (FS), EXP, SVC, $T_{stamp}$, dCVV, MI, end sentinel (ES), and an error checksum character (LRC). The MI may be a flag for the card issuer server to recognize and perform authorization in the dynamic or dCVV mode. However, the MI may not be used if a future EXP is used as such an indicator, as described in further detail below.

Upon receiving the data, the card issuer server may understand the transmission is a dCVV transaction based on the MI or future EXP. It should also be appreciated that a PAN can also be registered by a provisioning and authentication server to do a match during transaction so that a PAN registered may be checked against the provisioning and authentication server for authentication of the dCVV. The card issuer server may request the provisioning and authentication server for verification of the dCVV (808). The provisioning and authentication server then returns an authentication or an authorization failure (810). If the PAN is not found, the provisioning and authentication server returns a PAN not registered error. The provisioning and authentication server compares the $T_{stamp}$ received with the time that is currently on the server. The comparison algorithm may be performed as follows: if the $T_{stamp}$ received is later in time than the $T_{stamp}$ stored, the time stamp is ok; if the $T_{stamp}$ received is earlier in time than the $T_{stamp}$ stored, the time stamp is incorrect and returns an authorization failure; if the $T_{stamp}$ received matches the $T_{stamp}$ stored return an authorization failure is returned the counter value received is less than the counter value stored, otherwise the time stamp is ok.

During the verification, the provisioning and authentication server independently computes dCVV with $K_{dCVV}$ stored on the provisioning and authentication server and checks to see if the computed value is identical to the dCVV received. If the computed dCVV matches the dCVV received and the $T_{stamp}$ is ok, the provisioning and authentication server updates the $T_{stamp}$ currently stored with the $T_{stamp}$ it received. The provisioning and authentication server then returns an authentication or an authorization failure (810). If the computed value is not identical to the dCVV received, the provisioning and authentication server returns an authorization failure. The card issuer server may also perform one or more routine checks that the card issuer server usually conducts when authorizing a regular card (812) and returns a final authorization result to the acquirer server (814), which forwards the message to the POS (816). If a failure is returned to the POS, the transaction may be cancelled. If final authorization is returned to the POS, the transaction may proceed.

Figure 9:
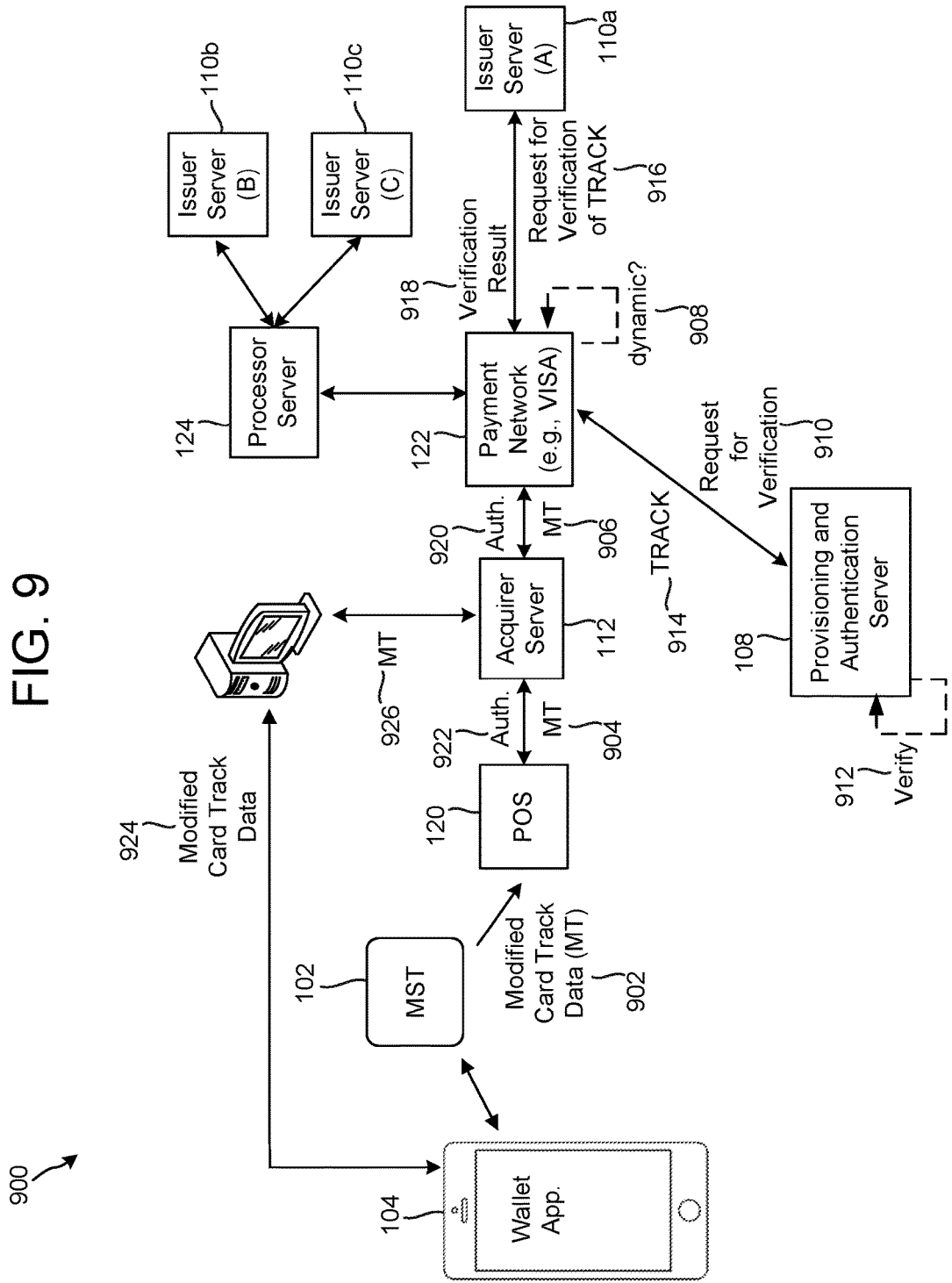
FIG. 9 is a flow diagram of another method of performing dCVV according to aspects of the disclosure.

In another embodiment, a payment network (for example, VISA) or a third party processor server may handle the dCVV and authorize the transaction. FIG. 9 illustrates such a method 900 for performing dCVV according to an illustrative embodiment. In this embodiment, the modified track data containing the dCVV is sent from the MST to the POS terminal (902), which forwards the modified card data to the acquirer server (904), which then forwards the modified card data to a payment network, such as a server operated by VISA (906), if applicable. In some cases the acquirer server sends the transaction directly to the card issuer or processor server bypassing the payment network (known as an "on us" transaction), for these cases the provisioning authentication server would be hosted at the card issuer or processor server instead. As described above, the dCVV may include a 3 digit code that is computed as a function of $K_{dCVV}$, including the PAN, expiration date of the card (EXP), service code (SVC), and $T_{stamp}$. For example, dCVV=$fK_{dCVV}$(PAN, EXP, SVC, $T_{stamp}$). After dCVV is generated, the counter value stored in the MST within the current time unit interval (i.e. 10 min, 1 hour, etc.), is incremented by one.

The payment network then checks whether the data corresponds to a dynamic card (908), for example, by checking for the MI or a modified EXP value. As described herein, replacing a current EXP with fixed date in the future (for example, December 2048) can function as a MI. Upon seeing this specific EXP, the payment network can proceed with dCVV validation. When the EXP is used as a MI, there is no need to allocate an additional digit for MI and the original, true EXP on the physical card issued can be protected because it is not transmitted.

When the payment network recognizes the data as dynamic, the payment network requests the provisioning and authentication server for verification of the dCVV (910), for example, using the PAN. If the PAN is not found within the provisioning and authentication server, an authorization failure is returned to the POS. When the PAN is in the provisioning and authentication server, the provisioning and authentication server verifies the card (912). To perform this verification, the provisioning and authentication server may check to see if the $T_{stamp}$ received from the transaction is recent based on its own server time, i.e., that it is not a replay of an old transaction. For example, the provisioning and authentication server compares the $T_{stamp}$ it received from the transaction with the $T_{stamp}$ it last saw under the same card. If the $T_{stamp}$ received is greater (later in time) than the $T_{stamp}$ stored, the time stamp is ok; if the $T_{stamp}$ received is less (earlier in time) than the $T_{stamp}$ stored, the time stamp is incorrect, an authorization failure is returned; and if the $T_{stamp}$ received is equal to the $T_{stamp}$ stored, an authorization failure is returned when $CC_{Received}$ is less than $CC_{Stored}$, otherwise the time stamp is ok. When the time stamp is ok, the provisioning and authentication server updates the $T_{stamp}$ currently stored with the $T_{stamp}$ it received, and in the last case, $CC_{Stored}$ is incremented by one.

The provisioning and authentication server independently computes the dCVV using the $K_{dCVV}$ stored, and checks to see if the computed value matches the one received. If not, an authorization failure is returned. If the dCVV cryptogram is both valid and freshly generated, the provisioning and authentication server performs a process of restore. This process removes the dynamic components of the track data, such as, SVC, $T_{Stamp}$ and dCVV, and inserts the original track content at the corresponding locations inside the track. This process completely restores the original track data (TRACK) as issued by the card issuer. The provisioning and authentication server then sends the restored TRACK to the payment network (914).

The payment network may also forward the TRACK to the card issuer server for verification (916), which verifies the TRACK and sends a verification or an authorization failure back to the payment network (918). The payment network then sends the authorization of payment or an authorization failure to the acquirer server (920), which forwards the authorization of payment or authorization failure to the POS (922).

When the card issuer utilizes a third party processor, the payment network may communicate with the third party processor to verify the TRACK. Additionally, in some embodiments, the card issuer server or the third party processor may communicate directly with the provisioning and authentication server to verify the dCVV and process the transaction. In some embodiments, the provisioning and authentication server may be hosted by the card issuer or card issuer server, the card issuer's processor or processor server, or the card issuer's payment network or payment network server.

In another aspect, the user may utilize the dCVV and/or modified EXP date in a CNP transaction, for example, when filling out an online payment form. In this aspect, the wallet application on the mobile communication device, may calculate or cause the MST to calculate the dCVV and/or modified EXP and display one or more of these to the user. The user may then input the dCVV and/or modified EXP into an online transaction form and send the modified track data, including the dCVV and/or modified EXP, to an ecommerce server (924), the ecommerce server may then forward the modified track data to the acquirer server (926). The authorization may then proceed as described above with reference to steps 906-920.

Another way to indicate card data as a dCVV track transmission is to use a modified EXP value. As an example, replacing the card's current EXP with a fixed value, for example, '4812' (December-2048). Upon seeing this specific EXP, the card issuer server can proceed under the dynamic or dCVV mode. In this aspect, there is no need to allocate an additional digit for MI and the original, the true EXP on the physical card issued can be protected because it is not transmitted, thus protecting the PAN to be used with EXP and name for certain online or CNP transactions. If MI is not used, the dCVV occupies 6 digits.

In an aspect, this disclosure also relates to devices, systems, and methods that obscure and reuse the EXP in transactions or card systems. Replacing the EXP with a number equivalent to a date far into the future obscures the EXP in the transaction while providing the card issuer with a convenient flag to recognize the card as being dynamic. For example, if an unauthorized person tries to use this EXP for an online purchase, it would be declined by the card issuer server, unless it is accompanied by a CVV-2 that is also dynamically generated by a MST, or by remote means from a Token Service Provider (TSP) (for example, the provisioning and authentication server) or a card issuer server, displayed to the cardholder on his/her mobile device at time of transaction request and would change on each new request by user, and expires after a short time. This dynamic CVV-2 can then be authenticated in the provisioning authentication server run by the card issuer server or TSP. Thus making stolen card data for dynamic or dCVV cards effectively useless for not only card present transactions, but also for CNP transactions, because the number taking the place of the EXP can be used as a special indicator for dynamic security or dCVV cards.

This is important because it can help card issuers/card issuer servers provide a more secure transaction method for their card holders not only for physical card payments using existing POS infrastructure, but also for online or CNP card payments also using the existing CNP payment infrastructure without changing the merchants' online checkout systems. It is a fast solution to improve online payment security without waiting for massive merchant change.

Given that the card data may be generated for each new transaction and delivered via a mobile communication device instead of on plastic cards, the EXP for these types of transactions may no longer be needed, the card issuers/card issuer servers do not have to replace these mobile single use cards in the field. The EXP printed on the front of the physical plastic card that issuers do send in the mail, or static cards shown in an electronic wallet can remain with the original EXP for the purpose of online shopping with consumers' plastic cards the traditional way. The card issuer/card issuer server and the network would be able to distinguish this as being a standard static card and process it accordingly.

In POS transactions, retail systems read the EXP and will reject the card if the EXP (MMYY) data on the magnetic stripe or in the EMV message is earlier than the current date. EXPs far in the future, however are accepted by the POS and acquirer systems as valid.

The EXP on the magnetic stripe, in a magnetic stripe transmission (MST) or smart card (such as, an EMV card) message may be replaced by a specific number that represents a date far in the future. The number, in the YYMM format, that is interpreted by the POS reading it as a future date, but to the card issuer/card issuer server it is in fact an indicator that the card data contains a variable authentication element, such as a dCVV. For example, the EXP may be replaced with a number 4912. The retail system would interpret this number as a future date (December, 2049) while the card issuer/card issuer server would recognize 4912 as an indicator for a dCVV card and switch or process it accordingly.

Figure 10:
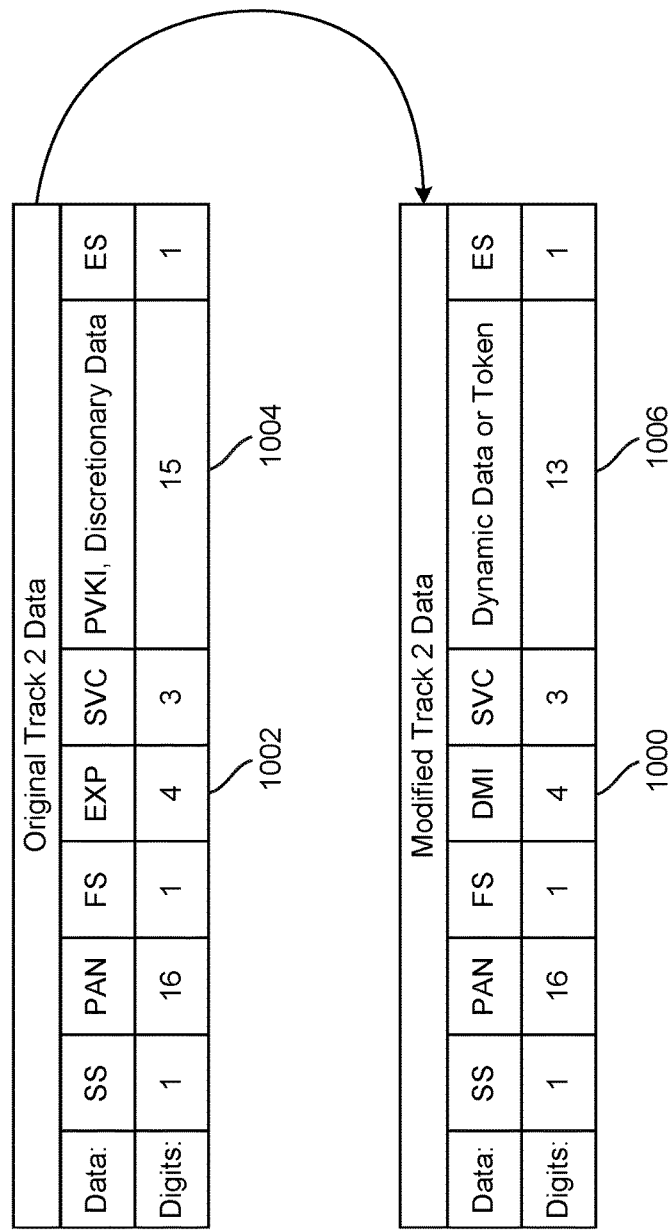
FIG. 10 is a diagram of modifying an expiration date of card data according to aspects of the disclosure.

FIG. 10 illustrates how the track 2 data is modified according to an aspect of the disclosure. This merely illustrates the concept of a dCVV track format. The track 1 dCVV format is similar, but with an added field, such as, a card holder name and its field separators.

As illustrated in FIG. 10, a Dynamic Mode Indicator (DMI or just MI) 1000 may be used to replace the card EXP 1002. The DMI 1000 is a 4 digit long number that replaces the card EXP 1002 and is set far in the future. POS systems and acquirers read the DMI 1000 as an expiry data, but the card issuers/card issuer servers recognize the number as an indicator of the dynamic or token mode. Additionally, the Pin Verification Key Indicator (PVKI)/discretionary data 1004 may be modified or replaced with dynamic data or a token 1006.

The dynamic data 1006 typically contains of two parts: the time-stamp (or in a counter-based variant, a 7 digit monotonically increasing number), and the dCVV which is a 3 digit to 6 digit numeric string computed using a one-way-keyed-hash function over SS, PAN, DMI and SVC. The MST may be configured to adjust its internal reference of time, for example, to Jan. 1, 2014 15:00. This allows the MST to provide an accurate time-stamp. The MST transmits the time-stamp plus a cryptogram which is generated using the $K_{dCVV}$, PAN, EXP, and the time-stamp (the time-stamp+cryptogram is 1006). Since the time-stamp is synchronized, as described above, the server that performs authorization can check for packet freshness and verify the cryptogram. The use of time-stamp serves to prevent replay type attacks because the cryptogram generation is time-stamped, and any delay in consuming the cryptogram risks it being rejected by the authorization logic on server.

Thus, stolen magnetic stripe or smart card data containing the PAN and the modified EXP (DMI) would not be useful for card not present fraud because the EXP obtained from the stolen card data would not match the EXP on file for the account and thus would be declined by the card issuer/card issuer server.

Figure 11:
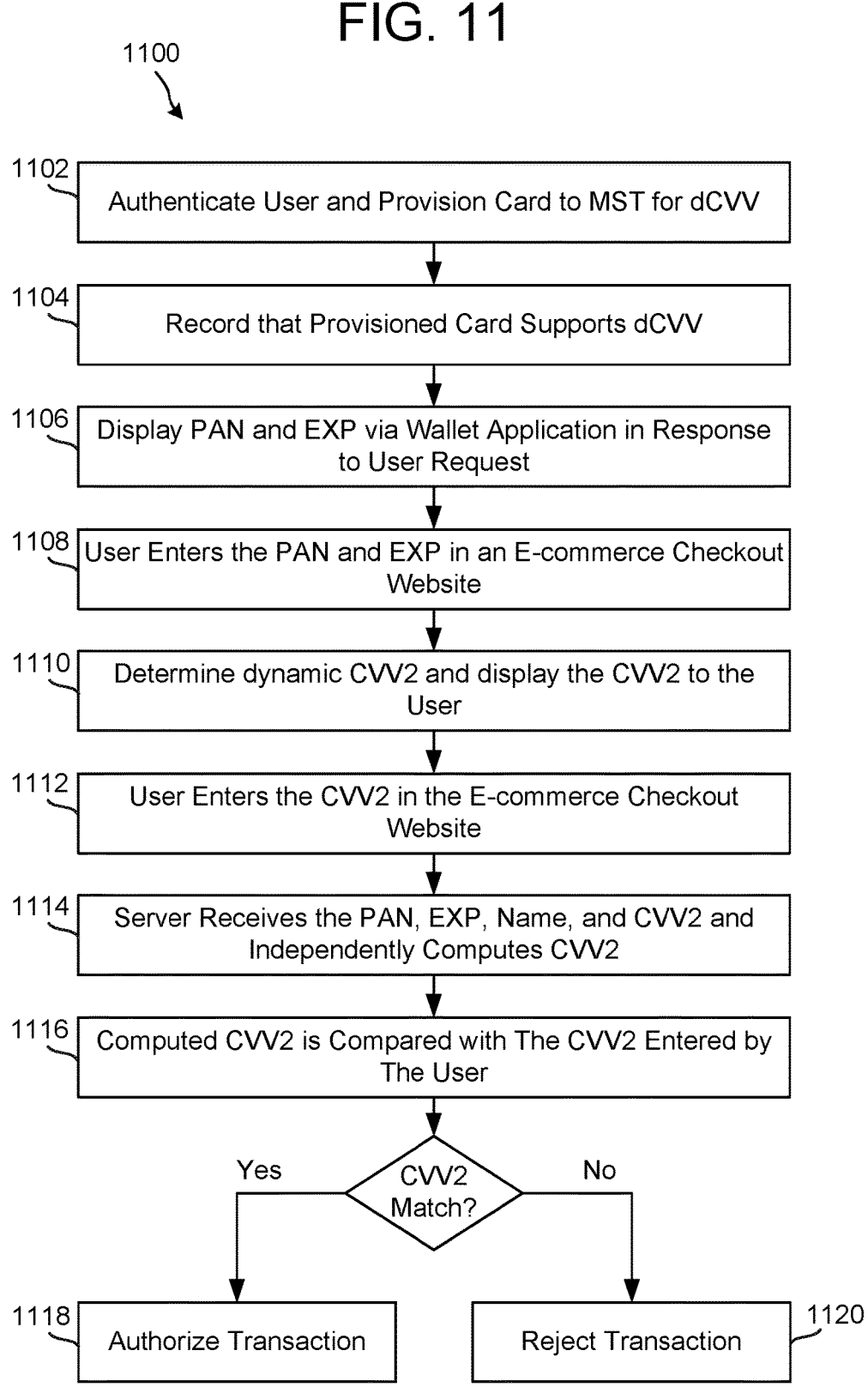
FIG. 11 is a block flow diagram of a method of performing dCVV for e-commerce transactions according to aspects of the disclosure.

FIG. 11 illustrates a block flow diagram of a method 1100 of dCVV for online e-commerce transactions. As illustrated in FIG. 11, the user authenticates with the card issuer server and a card is provisioned into the MST that supports dynamic CVV, illustrated as block 1102, as described above. The card issuer server and/or payment network records, in the provisioning and authentication server, that the provisioned card supports dynamic or dCVV mode for online e-commerce transactions only or for both e-commerce and physical swipe at POS transactions, illustrated as block 1104. As described above, the PAN (or hash of the PAN) may be used as an identifier in the provisioning and authentication server, a $K_{dCVV}$ may also be issued and securely delivered to the MST.

A user may then use the card at checkout at an online e-commerce website. For example, the user may cause the mobile communication device to display the 16 digit PAN and EXP for the provisioned card via the wallet application, illustrated as block 1106. The user may then enter the PAN and EXP into an online e-commerce website at checkout, illustrated as block 1108. The wallet application working with the MST calculates and displays a dynamically generated CVV-2 for the user to enter into the online e-commerce website, illustrated as block 1110.

The EXP can be the real EXP of the card or a modified future EXP for use as a mode indicator. When the EXP is not modified, the provisioning and authentication server authorizes the transaction based on dCVV because it knows, based on the PAN, that the card is registered under dCVV for e-commerce transactions. When the EXP is modified, this provides a blurring effect that hides the true EXP; and an additional insurance that the card should be authorized under dCVV.

The CVV-2 may be calculated by the wallet application and MST based on the PAN, real EXP, SVC and the current time-stamp. Since the time-stamp is implicitly and universally synchronized, as described above, the authorization server (for example, the card issuer server or provisioning and authentication server) does not need to be informed of the time-stamp that the CVV-2 was based on. The CVV-2 here may be a deterministic function of the cryptogram described above and generated in a substantially similar way. The cryptogram may also be digitized using a digitization function. For example, by taking the first three characters from the cryptogram and performing a modulo operation on every character, for example, by 10, to obtain the 3-digit CVV-2.

The user enters the dynamically generated CVV-2 into the online e-commerce website, illustrated as block 1112. The authorization server (for example, the card issuer server, the payment network, or provisioning and authentication server) receives the PAN, EXP, Name, and CVV-2 and checks its current time-stamp, and independently computes CVV-2 using the same algorithm, illustrated as block 1114. The computed CVV-2 is compared with the CVV-2 entered by the user, illustrated as block 1116, to authorize the transaction if they match, illustrated as block 1118, or reject the transaction if they do not match, illustrated as block 1120. The authorization server (for example, the card issuer server, the payment network, or provisioning and authentication server) may also tolerate +/−X time-stamp where X is configurable.

In the event, the online e-commerce website or merchant stores the EXP and not the CVV2 for repeat transactions, the card issuer may allow the transaction to go through without the CVV2. For example, a CVV2 may not be required for a recurring payment and when there is an indication that the merchant is using the card data for recurring payment purposes the card issuer may allow the transaction to proceed. In the case where the EXP is dynamic, when the EXP is reused during a normal transaction the transaction may fail. In any event, when using recurring payments, the card issuer may choose to allow the transaction to continue because a previously valid transaction was successfully completed, otherwise the card issuer may decline the transaction. Similarly for refunds, card issuers may rely on the PAN to issue a refund relating to a particular transaction in their own system.

In general, the MST 102 can be used to interact with a merchant point of sale (POS) by transmitting card data from a magnetic field transmitter to a magnetic stripe reader (MSR) of the merchant POS and used in e-commerce transactions as described above. As illustrated in FIG. 12, the MST 102 may include a microprocessor 1202, a light-emitting diode (LED) indicator 1204, a power source 1206, optionally a magnetic stripe reader (MSR) 1208, a memory storage component or secure element 1210, an input/output interface 1212 (for example, a 3.5 mm or other standard audio port, a USB port/jack interface or other communication interface, including but not limited to a 30pin or 9pin Apple interface, a Bluetooth interface, and other serial interfaces), and a magnetic field transmitter 1214 which includes a driver and an inductor for transmitting magnetic pulses to be received by any POS device with a MSR, such as the POS 120.

Microprocessor 1202 handles security and communications with the mobile communication device 104. The microprocessor 1202 can also transmit and receive encrypted card data to and from the secure element 1210. The magnetic field transmitter 1214 transmits magnetic stripe data of a cardholder to the POS device 120 by transmitting magnetic impulses to the MSR of the POS device 120. The magnetic impulses or signals may be transmitted at a distance of approximately 1 to 3 inches from the MSR of the POS 120. The MST 102 may also be used for reading other magnetic stripe cards by using the optional MSR 1208. The MSR 1208 may be used for loading payment card data onto the secure element 1210 and for capturing card track data.

The mobile communication device 104 includes the wallet application, and may also include a display with key pad or touchpad display and a central processing unit (CPU). The wallet application initializes and unlocks the MST 102, interacts with the MST 102 and accepts card payment data from the MST 102. The mobile communication device 104 may also interact with the MST 102 to display a CVV-2 for the user to enter into an online e-commerce transaction using dCVV.

The card data may be encrypted, and the encrypted data may be transmitted to the mobile communication device 104. The wallet application may transmit the data to the server. The data may be decrypted at the server and the primary account number (PAN) data, card number, expiration and name of the cardholder is stripped from the track data. The wallet application or the server may also make a determination as to whether the magnetic card is a payment card or a non-payment card. If the magnetic card is a non-payment card the MST 102 can automatically store the card data in the memory for non-payment transmission. If the magnetic card is a payment card, for example, having a specific format recognizable to the system, the card may be detected as a payment card and the system determines if the name on the payment card matches the name of the user account. If the name does not match, an error message may arise. If the name on the payment card matches the name of the user account, the system may determine if the PAN number matches an existing card already stored on the server, to either create a new account or leave the existing one. If a new card is created, the system may store the card data in a payment section of MST's secure memory encrypted.

As described above, the MST 102 has the ability to load any type of magnetic stripe card into the memory means, not just payment cards. Non-payment cards may be stored separately with less security for convenience. For example, some non-payment applications may include cards to open doors, loyalty cards, etc. The loading of payment data vs. non-payment data may be separated into two separate fields or storage areas. In an example, payment cards may not be loaded into non-payment storage. For example, payment data may have a specific format that can be detected and may not be allowed to be loaded into the non-payment storage area. The payment cards may also require authentication with the application before being transmitted. On the other hand, default non-payment data may be transmitted without authentication.

The devices, systems, and methods disclosed herein provide for the card data to be captured and stored in the MST's secure memory means directly by the user without modification, and to be used later with a POS or other MSR device.

The unique connection or registering of a MST to a user account such that the MST can be only used with that account for card data storage and transmission use provides security.

The MST is capable of connecting to mobile communication devices via different interfaces beyond audio jack and USB connections (such as Bluetooth, and other wireless communication interfaces). The devices, systems, and methods allow for the loading of encrypted card data into the memory means of the MST that can later be decrypted and transmitted to the POS, or can be transmitted encrypted to the mobile communication device and then routed to the payment server for decryption and processing for loading a user account on the server or processing a POS transaction. The devices, systems, and methods provide for the ability to use the stored card data or swiped card data for virtual checkout environments for a more secure and lower cost transaction for merchants. The devices, systems, and methods provide for the remote loading and transmission of card data from a card issuer to the wallet server provider, to the wallet application on the mobile communication device, and to the SE or memory means of the MST for later use. The devices, systems, and methods also provide for the ability to load loyalty account information along with the payment card data into one or more discretionary fields of the card data to be read by the issuer during or after a transaction, which can lead to offers and loyalty programs combined with a payment transaction.

Generally, the devices, systems, and methods disclosed herein can include, and may be implemented within, a number of different devices and computer systems, including, for example, general-purpose computing systems, POS systems, server-client computing systems, mainframe computing systems, a cloud computing infrastructure, telephone computing systems, laptop computers, desktop computers, smart phones, cellular phones, personal digital assistants (PDAs), tablet computers, and other mobile devices. The devices and computing systems may have one or more databases and other storage apparatuses, servers, and additional components, for example, processors, modems, terminals and displays, input/output devices, computer-readable media, algorithms, modules, and other computer-related components. The devices and computer systems and/or computing infrastructures are configured, programmed, and adapted to perform the functions and processes of the systems and methods as disclosed herein.

Communications between components in the devices, systems, and methods disclosed herein may be unidirectional or bidirectional electronic communication through a wired or wireless configuration or network. For example, one component may be wired or networked wirelessly directly or indirectly, through a third party intermediary, over the Internet, or otherwise with another component to enable communication between the components. Examples of wireless communications include, but are not limited to, radio frequency (RF), infrared, Bluetooth, wireless local area network (WLAN) (such as WiFi), or wireless network radio, such as a radio capable of communication with a wireless communication network such as a Long Term Evolution (LTE) network, WiMAX network, 3G network, 4G network, and other communication networks of the type.

The methods disclosed herein may be performed in different forms of software, firmware, and/or hardware. The methods disclosed herein may be performed on a single device or may be performed on multiple devices. For example, program modules including one or more components may be located in different devices and may each perform one or more aspects of the present disclosure.

Although the devices, systems, and methods have been described and illustrated in connection with certain embodiments, many variations and modifications will be evident to those skilled in the art and may be made without departing from the spirit and scope of the disclosure. The discourse is thus not to be limited to the precise details of methodology or construction set forth above as such variations and modification are intended to be included within the scope of the disclosure.

What is claimed is:

1. An apparatus comprising:
    a magnetic transmitter including a driver and an inductor to transmit magnetic pulses to be contactlessly recognized by a point of sale terminal; and
    a processor executing a wallet application configured to:
        receive an encrypted token and a first key associated with a payment card from one or more servers, the encrypted token encrypted by a second key associated with the magnetic transmitter,
        forward the encrypted token to the magnetic transmitter,
        generate cryptogram data based on the first key, and based on count information associated with a magnetic stripe transmission,
        generate a payment message, compliant with a magnetic card track data format, using the cryptogram data, and using track data included in the encrypted token after being decrypted by the magnetic transmitter,
        transmit, via the magnetic transmitter, the magnetic stripe transmission as magnetic pulses corresponding to the generated message to a point of sale terminal, and
        increment the count information prior to a next magnetic stripe transmission.

2. The apparatus of claim 1, wherein the payment message is generated by including the cryptogram data in one of fields of track2 data.

3. The apparatus of claim 1, wherein the payment message comprises track2 data having a plurality of fields arranged according to track2 data format, and the track2 data is modified by inserting the cryptogram data in one of the fields of track2 data.

4. The apparatus of claim 1, wherein the processor executing the wallet application is configured to provide a user interface for displaying a list of cards available for transactions.

5. The apparatus of claim 1, wherein the processor executing the wallet application is configured to provide a user interface for displaying a list of cards available for card-not-present (CNP) and card-present (CP) transactions.

6. The apparatus of claim 1, wherein the magnetic card track data format includes data fields for primary account number (PAN) and expiry date (EXP).

7. The apparatus of claim 6, wherein the payment message, compliant with the magnetic card track data format, includes a field separator (FS) disposed between the data field for PAN and the data field for EXP.

8. The apparatus of claim 7, wherein the payment message, compliant with the magnetic card track data format, further includes an error checksum character (LRC).

9. The apparatus of claim 8, wherein the payment message, compliant with the magnetic card track data format, further includes end sentinel (ES).

10. The apparatus of claim 6, wherein the magnetic card track data format further includes a data field for a flag for a card issuer server to recognize and perform authorization in a CVV (card validation value) mode.

11. A method for transmitting payment card magnetic stripe data, comprising:
   providing a magnetic transmitter including a driver and an inductor to transmit magnetic pulses to be contactlessly recognized by a point of sale terminal; and
   providing a processor executing a wallet application including the steps of,
      receiving an encrypted token and a first key associated with a payment card from one or more servers, the encrypted token encrypted by a second key associated with the magnetic transmitter,
      forwarding the encrypted token to the magnetic transmitter;
      generating cryptogram data based on the first key, and based on count information associated with a magnetic stripe transmission,
      generating a payment message, compliant with a magnetic card track data format, using the cryptogram data and using track data included in the encrypted token after being decrypted by the magnetic transmitter,
      transmitting, via the magnetic transmitter, the magnetic stripe transmission as magnetic pulses corresponding to the generated message to a point of sale terminal, and
      increment the count information prior to a next magnetic stripe transmission.

12. The method of claim 11, wherein generating the payment message comprises including the cryptogram data in one of fields of track2 data.

13. The method of claim 11, wherein generating the payment message comprises using track2 data having a plurality of fields arranged according to track2 data format, and modifying the track2 data by inserting the cryptogram data in one of the fields of track2 data.

14. The method of claim 11, further comprising the step of configuring the processor executing the wallet application to provide a user interface for displaying a list of cards available for transactions.

15. The method of claim 11, further comprising the step of configuring the processor executing the wallet application to provide a user interface for displaying a list of cards available for card-not-present (CNP) and card-present (CP) transactions.

16. The method of claim 11, wherein the magnetic card track data format includes data fields for primary account number (PAN) and expiry date (EXP).

17. The method of claim 16, wherein the payment message, compliant with the magnetic card track data format, includes a field separator (FS) disposed between the data field for PAN and the data field for EXP.

18. The method of claim 17, wherein the payment message, compliant with the magnetic card track data format, further includes an error checksum character (LRC).

19. The method of claim 18, wherein the payment message, compliant with the magnetic card track data format, further includes end sentinel (ES).

20. The method of claim 16, wherein the magnetic card track data format further includes a data field for a flag for a card issuer server to recognize and perform authorization in a CVV (card validation value) mode.

* * * * *